R. C. GORBEY.
PROTRACTOR.
APPLICATION FILED JAN. 20, 1909.
1,076,758.
Patented Oct. 28, 1913.
2 SHEETS—SHEET 2.
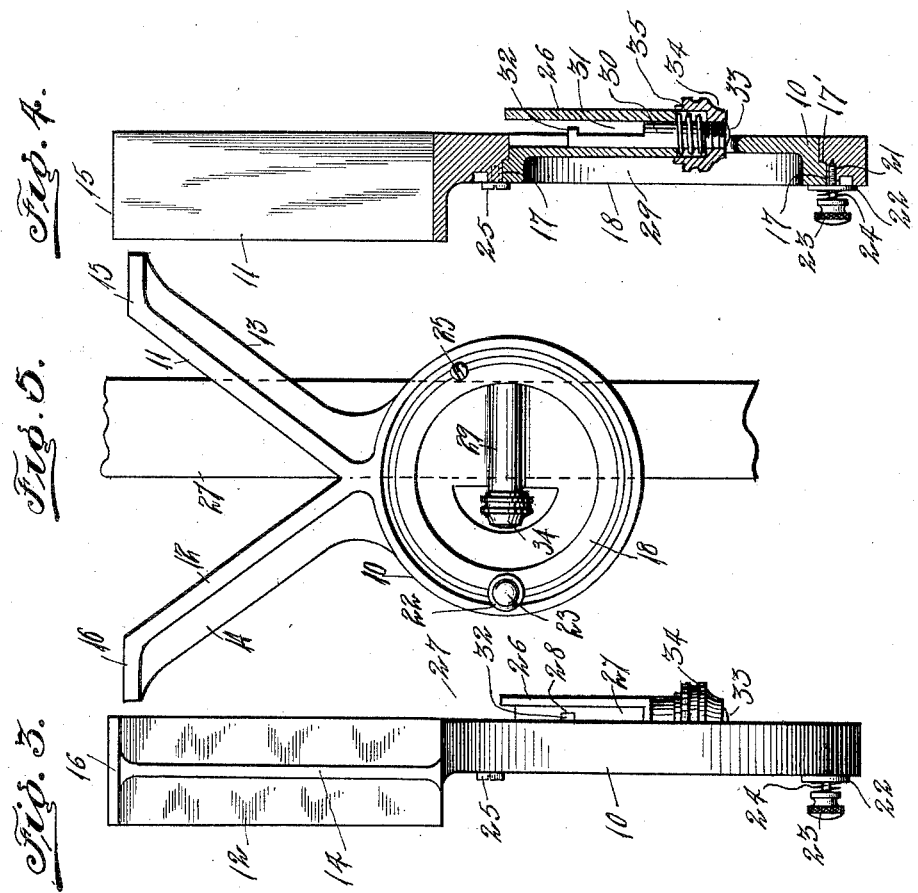
Witnesses
Jos Gregory
C. N. Woodward
Inventor
Robert C. Gorbey.
By 
Attorney

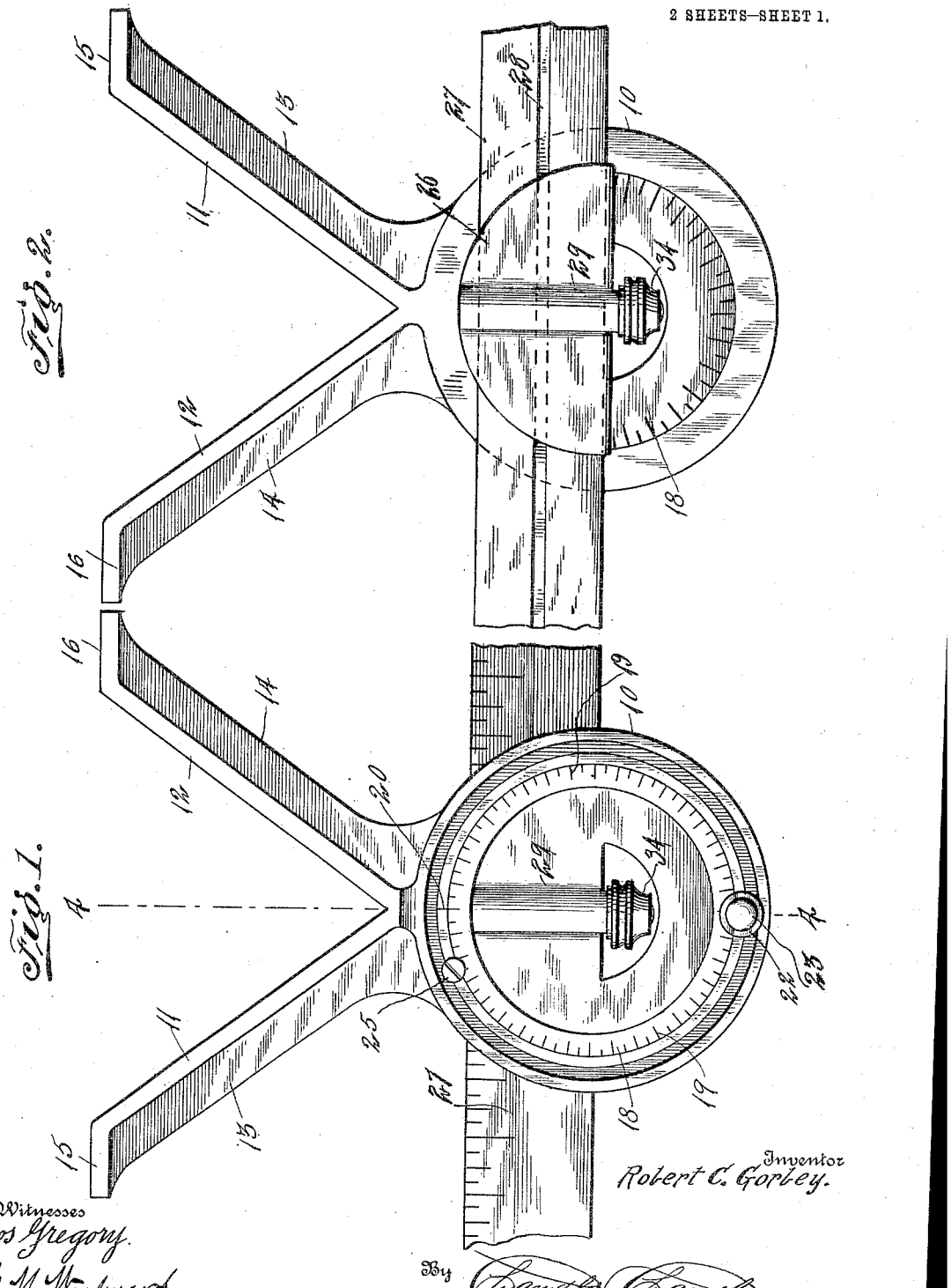

UNITED STATES PATENT OFFICE.

ROBERT C. GORBEY, OF CHESTER, PENNSYLVANIA.

PROTRACTOR.

1,076,758.   Specification of Letters Patent.   Patented Oct. 28, 1913.

Application filed January 20, 1909. Serial No. 473,217.

*To all whom it may concern:*

Be it known that I, ROBERT C. GORBEY, a citizen of the United States, residing at Chester, in the county of Delaware, State of Pennsylvania, have invented certain new and useful Improvements in Protractors; and I do hereby declare the following to be a full, clear, and exact description of the invention, such as will enable others skilled in the art to which it appertains to make and use the same.

This invention relates to devices employed by machinists and other workmen for determining the angles upon certain kinds of work, more particularly between shafts or other cylindrical bodies and other structures or parts of structures, and has for one of its objects to produce a simply constructed instrument of this character, whereby angles of any desired degree may be ascertained and scribed or otherwise disposed upon the work.

Another object of the invention is to produce a simply constructed instrument of this character whereby a circular body may be divided into any required number of faces, as for instance, when transforming a circular body into a polygonal body.

With these and other objects in view the invention consists in certain novel features of construction as hereafter shown and described and then specifically pointed out in the claim, and in the drawings illustrative of the preferred embodiment of the invention, Figure 1 is a side elevation from one side of the improved implement. Fig. 2 is a side elevation viewed from the opposite side. Fig. 3 is an edge view of the same. Fig. 4 is a section on the line 4—4 of Fig. 1. Fig. 5 is a side elevation showing the device adjusted for use as a center square or bevel.

The improved device comprises a head portion 10, preferably in annular form and with diverging extensions 11—12 forming a V-shaped recess at one side of the head 10, the point of said V lying on an extended diameter of said annular head, said diameter bisecting the included angle of the V. The diverging members 11—12 and the annular portion 10 are integral, or cast in one piece, the portions 11—12 being wider than the member 10 and strengthened by ribs 13—14. The terminals of the members 11—12 are extended laterally at 15—16 to form bearing faces at right angles to the member 10, the object to be hereafter explained. The member 10 is provided with an integral annular seat 17, the wall 17′ of which forms an annular shoulder, and mounted for rotation upon this seat is an annular plate 18 having degree graduations 19, the annular member 10 being provided with an indicator line 20 with which the degree graduations coöperate in the ordinary manner, as hereafter explained.

Tapped through the member 10 is a threaded aperture to receive a clamp bolt 21 operating against a washer 22, the clamp bolt provided with a head 23 and with a spring 24 between the head and the washer, the washer extending over the adjacent portion of the member 18. By this means the member 18 may be firmly clamped to the member 10 at any required point. A stop pin 25 is also tapped into the member 10 and projects over the adjacent portion of the member 18, the pin being located at a point opposite to the clamp bolt 21 and operating to prevent the member 18 from falling from its seat. By this simple means the member 18 may be rotated to any required extent to bring any required graduation opposite the indicator 20, and thus "set" the instrument.

Extending from the opposite side of the member 18 from the graduations 19 is a plate 26 to form a guideway for a straight edge 27, the latter having a longitudinal guide channel 28 in one face, as shown. Formed partly in the member 18 and partly in the plate 26 is a circular guideway 29 in which a pin 30 is slidably disposed, the pin having a portion cut away, as shown at 31, leading a projecting stud 32 to enter the channel 28 of the straight edge. The terminal of the pin 30 is threaded as shown at 33, and projects below the plate 26 and is provided with a clamp nut 34 having a socket to receive a spring 35. By this arrangement it will be obvious that the straight edge may be clamped in position relative to the member 18, or adjusted longitudinally thereon.

The converging portions 11—12 may be arranged to extend at any desired predetermined angle, but will preferably be arranged to extend at an angle of about 36 degrees relative to the radial line 20 of the member 10 and the terminals 15—16 of these portions, as before stated, are extended at right angles to or square with a line extending through the center of the V-shaped recess and the center of the member 10. The projections 11—12 by being of greater width than the head 10, as shown, increase the bearing surfaces of the members 11—12 and correspondingly increase the steadiness with which the implement is supported upon the body upon which it is disposed, which is generally, as above noted, a shaft or other cylindrical structure.

Referring to Fig. 5 of the drawings it will be seen that when the head is set with the straight-edge bisecting the included angle of the V the instrument can be used as an ordinary center square or as a bevel, the angle of the bevel being of course one-half the included angle of the V. It will be seen however that said bevel angle may be adjusted within a comparatively wide range by rotating the head portion, which will reduce or enlarge the angle between the straight edge and the face of the V leg. It is obvious however that the true angle between these parts will not be readable upon the equally graduated angular scale of the head, since the legs of the V do not intersect at the center of rotation.

The improved device may be used as a protractor by holding the angular head stationary and rotating the straight edge to aline with first one side and then the other side of the angle to be laid out or measured, said angle being read directly upon the graduated circular scale as is obvious.

The implement may be made any required size, or manufactured in varying sizes or sets to adapt it to work of various kinds, and to cylindrical or circular surfaces of any kind.

The implement will preferably be formed of cast iron or steel, but may be made of any suitable metal.

What is claimed, is:—

An implement of the class described comprising an annular head having diverging arms and an annular seat at one side of said head and including an annular shoulder, an annular member mounted for rotation within said seat having a bearing at one side engaging the seat of the head and an annular shoulder bearing upon the shoulder of the head, said annular member having a radially extending cylindrical socket formed integrally therewith, the outer portion of said socket being slotted to form a guide way, a straight edge slidable in said guide way, a pin slidable in said socket and engaging said straight edge, and means coacting with said pin for adjustably clamping said straight edge in its guide way.

In testimony whereof, I affix my signature, in presence of two witnesses.

ROBERT C. GORBEY.

Witnesses:
JOHN RIPKA,
E. A. HOWELL.

Copies of this patent may be obtained for five cents each, by addressing the "Commissioner of Patents, Washington, D. C."